(12) United States Patent
Ballapuram et al.

(10) Patent No.: US 11,940,908 B2
(45) Date of Patent: Mar. 26, 2024

(54) RELATIVE SIZE REDUCTION OF A LOGICAL-TO-PHYSICAL TABLE

(71) Applicant: Western Digital Technologies, Inc., San Jose, CA (US)

(72) Inventors: Chinnakrishnan Ballapuram, San Jose, CA (US); Shay Benisty, Beer Sheva (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/723,635

(22) Filed: Apr. 19, 2022

(65) Prior Publication Data
US 2023/0333976 A1 Oct. 19, 2023

(51) Int. Cl.
| | |
|---|---|
| *G06F 12/02* | (2006.01) |
| *G06F 11/07* | (2006.01) |
| *G06F 11/10* | (2006.01) |
| *G06F 12/0864* | (2016.01) |
| *G06F 12/0882* | (2016.01) |

(52) U.S. Cl.
CPC ........ *G06F 12/0246* (2013.01); *G06F 11/076* (2013.01); *G06F 11/1064* (2013.01); *G06F 12/0253* (2013.01); *G06F 12/0864* (2013.01); *G06F 12/0882* (2013.01); *G06F 2212/7201* (2013.01)

(58) Field of Classification Search
CPC ............... G06F 12/0246; G06F 11/076; G06F 11/1064; G06F 12/0253; G06F 12/0864; G06F 12/0882; G06F 2212/7201
See application file for complete search history.

(56) References Cited

U.S. PATENT DOCUMENTS

| | | | | |
|---|---|---|---|---|
| 2012/0226699 | A1* | 9/2012 | Lillibridge | G06F 16/2365 707/747 |
| 2013/0275656 | A1* | 10/2013 | Talagala | G06F 12/0246 711/103 |
| 2018/0217777 | A1* | 8/2018 | Jiang | G06F 3/0608 |
| 2019/0163902 | A1* | 5/2019 | Reid | G06F 9/3806 |
| 2019/0370169 | A1* | 12/2019 | Amato | G06F 12/1018 |
| 2020/0012595 | A1* | 1/2020 | Bordia | G06F 3/0673 |
| 2021/0073141 | A1* | 3/2021 | Conklin | G06F 12/0246 |
| 2021/0357147 | A1* | 11/2021 | Li | G06F 21/78 |

OTHER PUBLICATIONS

Ni et.al. "A Hash-based Space-efficient Page-level FTL for Large-capacity SSDs" Aug. 9, 2017, IEEE (Year: 2017).*

* cited by examiner

*Primary Examiner* — Tasnima Matin
(74) *Attorney, Agent, or Firm* — Michael Best & Friedrich LLP

(57) ABSTRACT

A data storage device whose controller is configured to apply a hash function to a logical address specified in a received host request to obtain a first portion of the corresponding physical address (e.g., the channel number or channel and die numbers). This feature of the controller enables the L2P table stored in the DRAM associated with the controller to have physical-address entries that contain therein only complementary second portions of the physical addresses, but not the first portions. Such shorter physical-address entries in the L2P table enable a corresponding beneficial reduction in the size of the DRAM and can further be leveraged to have optimized and aligned access to the L2P table in the DRAM.

20 Claims, 4 Drawing Sheets

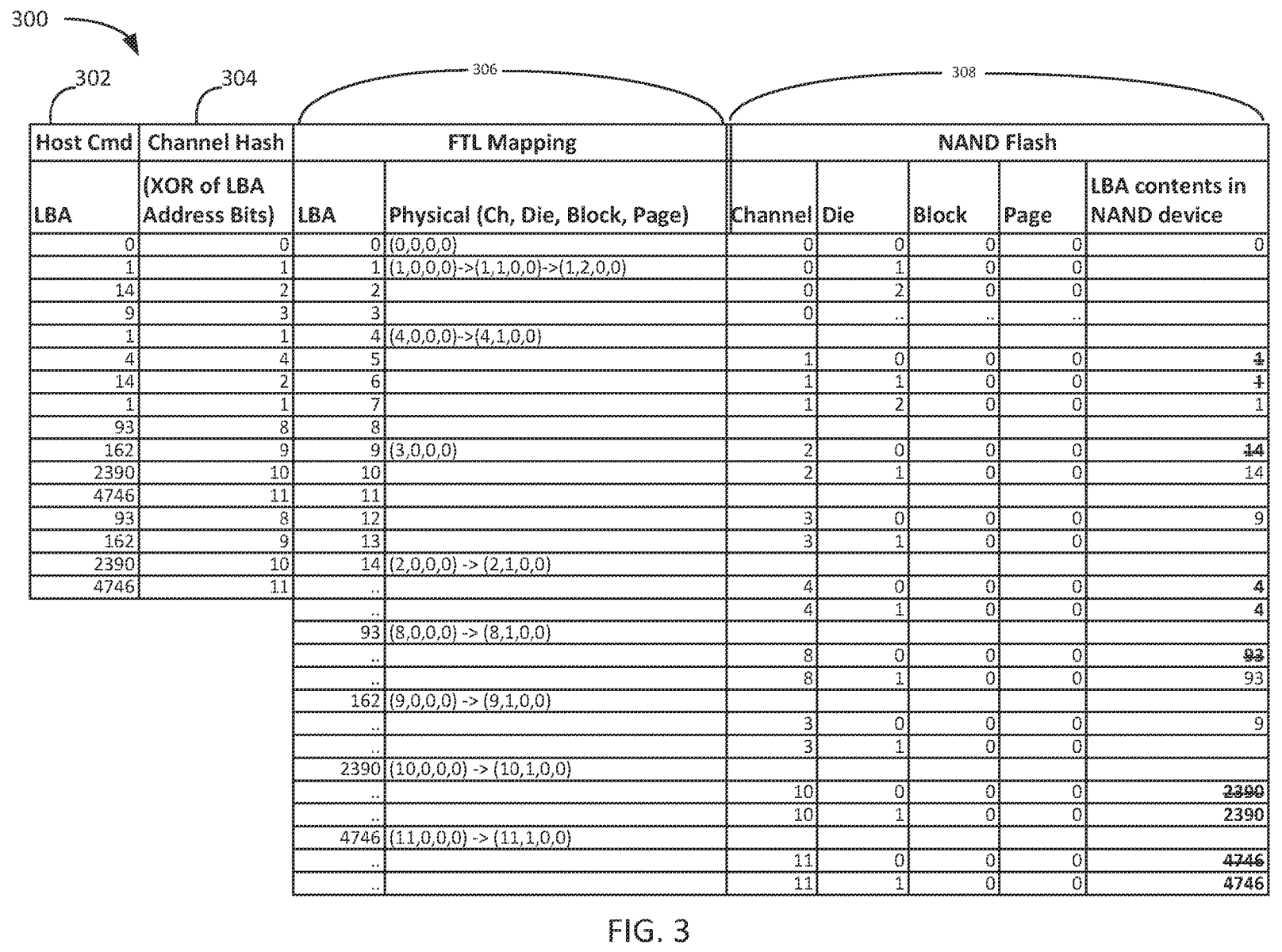

| Host Cmd | Channel Hash | FTL Mapping | | NAND Flash | | | |
|---|---|---|---|---|---|---|---|
| LBA | (XOR of LBA Address Bits) | LBA | Physical (Ch, Die, Block, Page) | Channel | Die | Block | Page | LBA contents in NAND device |
| 0 | 0 | 0 | 0 (0,0,0,0) | 0 | 0 | 0 | 0 | 0 |
| 1 | 1 | 1 | (1,0,0,0)->(1,1,0,0)->(1,2,0,0) | 0 | 1 | 0 | 0 | 0 |
| 14 | 14 | 2 | | 0 | 2 | 0 | 0 | 0 |
| 9 | 9 | 3 | | 0 | 3 | 0 | 0 | |
| 1 | 1 | 4 | (4,0,0,0)->(4,1,0,0) | 1 | 0 | 0 | 0 | ~~1~~ 1 |
| 4 | 4 | 5 | | 1 | 1 | 0 | 0 | ~~1~~ 1 |
| 14 | 14 | 6 | | 1 | 2 | 0 | 0 | 1 |
| 1 | 1 | 7 | | 2 | 0 | 0 | 0 | ~~14~~ 14 |
| 93 | 8 | 8 | | 2 | 1 | 0 | 0 | 14 |
| 162 | 9 | 9 | (3,0,0,0) | 3 | 0 | 0 | 0 | 9 |
| 2390 | 10 | 10 | | 3 | 1 | 0 | 0 | |
| 4746 | 11 | 11 | | 4 | 0 | 0 | 0 | 4 |
| 93 | 8 | 12 | | 4 | 1 | 0 | 0 | 4 |
| 162 | 9 | 13 | | 8 | 0 | 0 | 0 | ~~93~~ 93 |
| 2390 | 10 | 14 | (2,0,0,0) -> (2,1,0,0) | 8 | 1 | 0 | 0 | 93 |
| 4746 | 11 | ⋮ | | 3 | 0 | 0 | 0 | 9 |
| | | 93 | (8,0,0,0) -> (8,1,0,0) | 3 | 1 | 0 | 0 | |
| | | ⋮ | | 10 | 0 | 0 | 0 | ~~2390~~ 2390 |
| | | 162 | (9,0,0,0) -> (9,1,0,0) | 10 | 1 | 0 | 0 | 2390 |
| | | ⋮ | | 11 | 0 | 0 | 0 | ~~4746~~ 4746 |
| | | 2390 | (10,0,0,0) -> (10,1,0,0) | 11 | 1 | 0 | 0 | 4746 |
| | | ⋮ | | | | | | |
| | | 4746 | (11,0,0,0) -> (11,1,0,0) | | | | | |
| | | ⋮ | | | | | | |

FIG. 3

RELATIVE SIZE REDUCTION OF A LOGICAL-TO-PHYSICAL TABLE

FIELD

This application relates generally to data storage devices, and more specifically but not exclusively, to logical-to-physical (L2P) address translation.

BACKGROUND

This section introduces aspects that may help facilitate a better understanding of the disclosure. Accordingly, the statements of this section are to be read in this light and are not to be understood as admissions about what is in the prior art or what is not in the prior art.

Flash-based data storage devices use L2P tables to translate logical addresses of input/output (I/O) requests to corresponding flash-memory addresses. The layer that performs the translation is referred to as the flash translation layer (FTL). Controllers of some data storage devices may have a random-access memory (RAM) of a constrained size, which may limit the maximum size of the L2P table that can be stored therein. This L2P size constraint can be particularly challenging for the implementation of higher-capacity data storage devices.

SUMMARY

Disclosed herein are various embodiments of a data storage device whose controller is configured to apply a hash function to a logical address specified in a received host request to obtain a first portion of the corresponding physical address (e.g., the channel number or channel and die numbers). This feature of the controller enables the L2P table stored in the dynamic RAM (DRAM) associated with the controller to have physical-address entries that contain therein only complementary second portions of the physical addresses, but not the first portions. Such shorter physical-address entries in the L2P table beneficially enable nearly optimal and aligned accesses to the DRAM, wherein each physical-address entry has the same address alignment. Another benefit is a more-optimal use of the DRAM capacity.

According to an example embodiment, provided is a data storage device, comprising: a non-volatile memory to store user data; a volatile memory to store an L2P table; and a controller configured to: receive a host request specifying a logical address; compute a hash value by applying a hash function to the logical address, the hash value providing a first portion of a first physical address; retrieve a second portion of the first physical address from the L2P table based on the logical address; combine the first portion and the second portion to determine the first physical address; and perform a memory operation based on the first physical address.

According to another example embodiment, provided is a method of processing host requests in a data storage device comprising a non-volatile memory to store user data and a volatile memory to store an L2P table, the method comprising the steps of: receiving a host request including a logical address; computing a hash value by applying a hash function to the logical address, the hash value providing a first portion of a first physical address in the non-volatile memory; retrieving a second portion of the first physical address from the L2P table based on the logical address; combining the first portion and the second portion to determine the first physical address; and performing a memory operation based on the first physical address.

According to yet another example embodiment, provided is an apparatus comprising: non-volatile memory means for storing user data; volatile memory means for storing an L2P table; means for receiving a host request including a logical address; means for computing a hash value by applying a hash function to the logical address, the hash value providing a first portion of a first physical address; means for retrieving a second portion of the first physical address from the L2P table based on the logical address; means for combining the first portion and the second portion to determine the first physical address; and means for performing a memory operation in the non-volatile memory means based on the first physical address.

Various aspects of the present disclosure provide for improvements in data storage devices. For example, some embodiments may be used to streamline the processes in which garbage collection (GC) and host-device inputs/outputs are handled by data storage devices. The present disclosure can be embodied in various forms, including hardware or circuits controlled by software, firmware, or a combination thereof. The foregoing summary is intended solely to give a general idea of some specific embodiments and does not limit the scope of the present disclosure in any way.

BRIEF DESCRIPTION OF THE DRAWINGS

Other aspects, features, and advantages of example embodiments will become more fully apparent from the following detailed description, the appended claims, and the accompanying drawings in which like reference numerals identify similar or identical elements. Note that some elements in the figures may not be drawn to scale.

FIG. 3 is a table illustrating example operations performed in the data-storage system of FIG. 1 according to some embodiments.

DETAILED DESCRIPTION

In the following description, numerous details are set forth, such as data storage device configurations, controller operations, and the like, in order to provide an understanding of one or more aspects of the present disclosure. It will be readily apparent to one skilled in the art that these specific details are merely exemplary and not intended to limit the scope of this application. In particular, the functions associated with the controller can be performed by hardware (for example, analog or digital circuits), a combination of hardware and software (for example, program code or firmware stored in a non-transitory computer-readable medium that is executed by a processor or control circuitry), or any other suitable means. The following description is intended solely to give a general idea of various aspects of the present disclosure and does not limit the scope of the disclosure in any way. Furthermore, it will be apparent to those of ordinary skill in the pertinent art that, although the present disclosure refers to NAND flash, the concepts discussed herein may be applicable to other types of solid-state memory, such as NOR, PCM (Phase Change Memory), etc.

Figure 1:
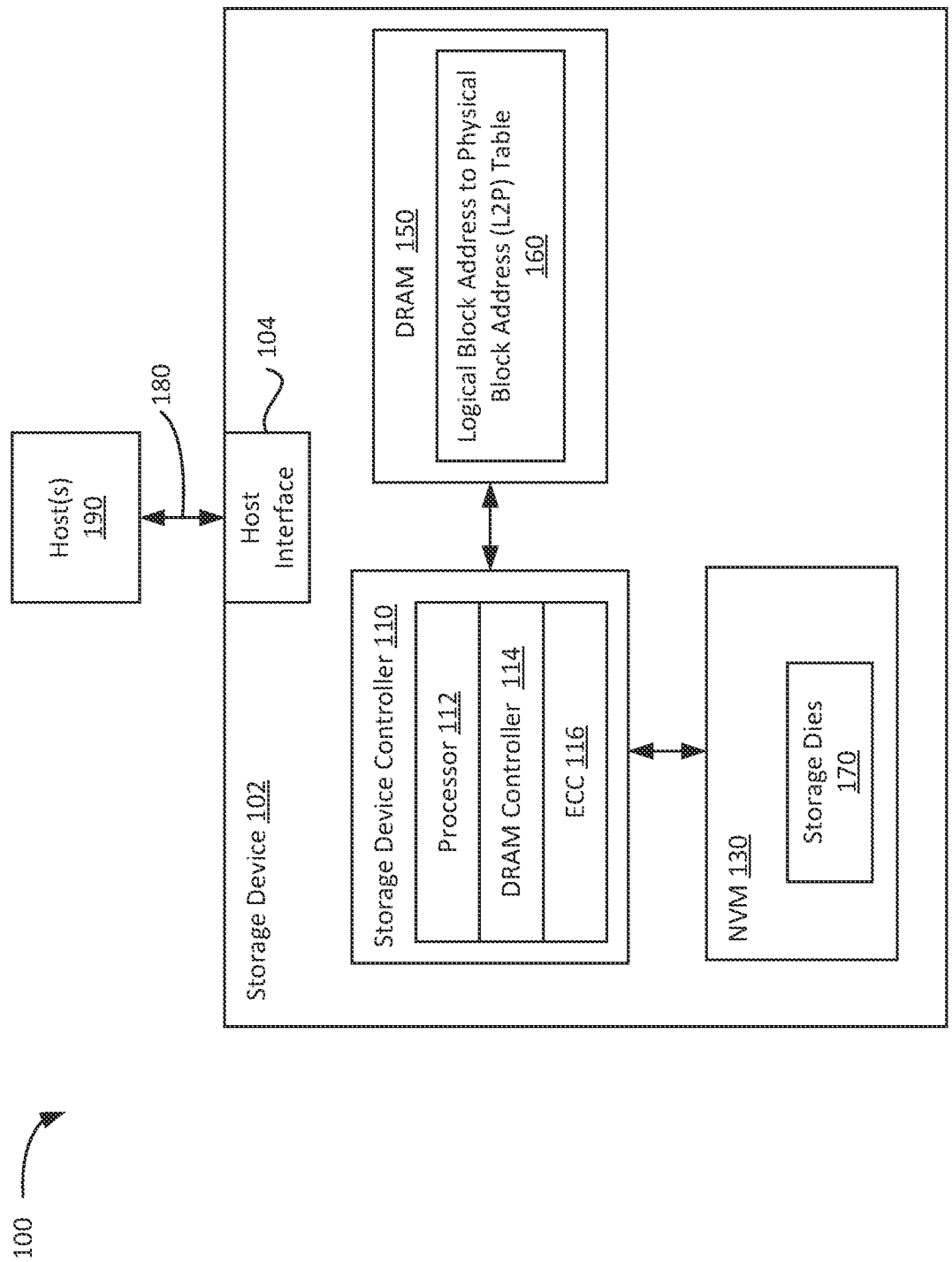
FIG. 1 is a block diagram illustrating a data-storage system in which example embodiments may be practiced.

FIG. 1 is a block diagram illustrating a data-storage system 100 in which example embodiments may be practiced. System 100 comprises a data storage device 102 connected to a host device 190 by way of a communication path 180. In an example embodiment, communication path 180 can be implemented using an electrical bus, a wireless connection, or any other suitable data link. Data storage device 102 can be a flash memory device, e.g., implementing a non-volatile memory (NVM).

In some embodiments, data storage device 102 may be embedded within host device 190. In some other embodiments, data storage device 102 may be removable from host device 190, e.g., may be removably coupled to the host device in accordance with a removable universal serial bus (USB) configuration. In some embodiments, data storage device 102 may be used as an embedded storage drive, e.g., a mobile embedded storage drive, an enterprise storage drive (ESD), a client storage device, a cloud storage drive, or other suitable storage device.

As shown in FIG. 1, data storage device 102 comprises a host-device interface 104, an electronic controller 110, an NVM 130, and a volatile memory (e.g., DRAM) 150. In operation, host-device interface 104 enables communications between data storage device 102 and host device(s) 190. Such communications may include, inter alia, transmission of data between NVM 130 and host device(s) 190. NVM 130 comprises storage dies 170, which may include any one type or any suitable combination of NAND flash devices, NOR flash devices, and other suitable non-volatile memory devices. Storage dies 170 may be organized into channels, each of the channels being based on a corresponding bus, e.g., an 8-bit bus, connecting the corresponding subset of storage dies 170 to controller 110. Individual ones of storage dies 170 may further be organized into a hierarchy of planes, blocks, and pages. NVM 130 and/or individual storage dies 170 thereof may also include support circuitry (not explicitly shown in FIG. 1), such as read/write circuitry. Such read/write circuitry may be implemented in a single component or may be divided into separate components, such as a read-circuitry component and a separate write-circuitry component. In an example embodiment, DRAM 150 is used, inter alia, to store an L2P table 160.

Controller 110 includes circuits, firmware, and software that bridge NVM 130 to host-device interface 104, with only some of said components being explicitly indicated in FIG. 1 for clarity. For example, controller 110 may include: (i) an embedded processor 112; (ii) an electrically erasable firmware read-only memory (ROM, not explicitly shown in FIG. 1); (iii) a DRAM controller 114; (iv) an ECC circuit or module 116; and (v) a flash component interface (not explicitly shown in FIG. 1). Processor 112 is configured to support, e.g., some or all of the following operations: wear leveling, bad-block management, data scrambling, garbage collection, address mapping, or other suitable operation. DRAM controller 114 operates as an electronic controller of DRAM 150. ECC entity 116 may typically include two submodules, with a first of the submodules running a first ECC applied to data stored in NVM 130, and with a second of the submodules running a different second ECC applied to data stored in DRAM 150, including the data of L2P table 160.

Host device 190 may address data stored in NVM 130 using a logical address. However, the data are stored in NVM 130 at physical addresses. The L2P table 160 is used to map from the logical address used by host device 190 to the physical address where the data are actually stored in NVM 130. When host device 190 requests to read data, controller 110 may look up the physical address in L2P table 160 to fetch the requested data. When host device 190 requests to write or update data in NVM 130, L2P table 160 will be updated accordingly.

A master L2P table may be stored in NVM 130 but, to be used or updated by controller 110, at least a pertinent portion of the master L2P table needs to be first stored in DRAM 150, e.g., in L2P table 160. If L2P table 160 is updated, then the updates need to be written back into the master L2P table stored in NVM 130. During the design process of data storage device 102, it may be stipulated whether or not DRAM 150 will be specified to hold a copy of the whole master L2P table for the entire logical address space. A decision not to hold the whole master L2P table in DRAM 150 may be due to, e.g., a constrained size of DRAM 150 as previously mentioned. Example embodiments disclosed herein are hence directed at providing a technique that enables L2P table 160 to hold a reduced or redacted version of the master L2P table with minimum impact on key performance characteristics of data storage device 102.

For illustration purposes and without any implied limitations, some example embodiments may be described hereinbelow in reference to page-level L2P mapping. From the provided description, a person of ordinary skill in the pertinent art will readily understand how to make and use other embodiments, e.g., implementing block-level L2P mapping or other specific granularities of L2P mapping.

For an example embodiment of NVM 130, with page-level L2P mapping, a physical address may include a channel number, a die number, a block number, and a page number. For a 4-kB page size, a 32-TB NVM 130 may require approximately 32 GB of such L2P entries. With the added ECC overhead, this volume of L2P entries can be accommodated, e.g., by a 40-GB DRAM 150. This estimate scales approximately linearly with the data capacity of NVM 130. For example, for a 128-TB NVM 130, a 160-GB DRAM 150 may be required. However, it may not be practical or feasible to keep increasing the size of DRAM 150 with the data-capacity increases of data storage device 102 in this manner, e.g., due to the cost increases associated with the DRAM and/or overruns of the available power budget.

This and possibly some other related problems in the state of the art may beneficially be addressed using at least some embodiments disclosed herein. For example, some embodiments may rely on a suitable hash function applied to a logical address or a portion thereof to obtain the channel number, which enables the use of an L2P table 160, wherein physical-address entries contain only die, block, and page numbers, but not the channel numbers. The resulting reduction in the size of physical-address entries in L2P table 160 may enable a corresponding beneficial reduction in the size of DRAM 150 and can further be leveraged to reduce the above-mentioned ECC overhead.

Figure 2:
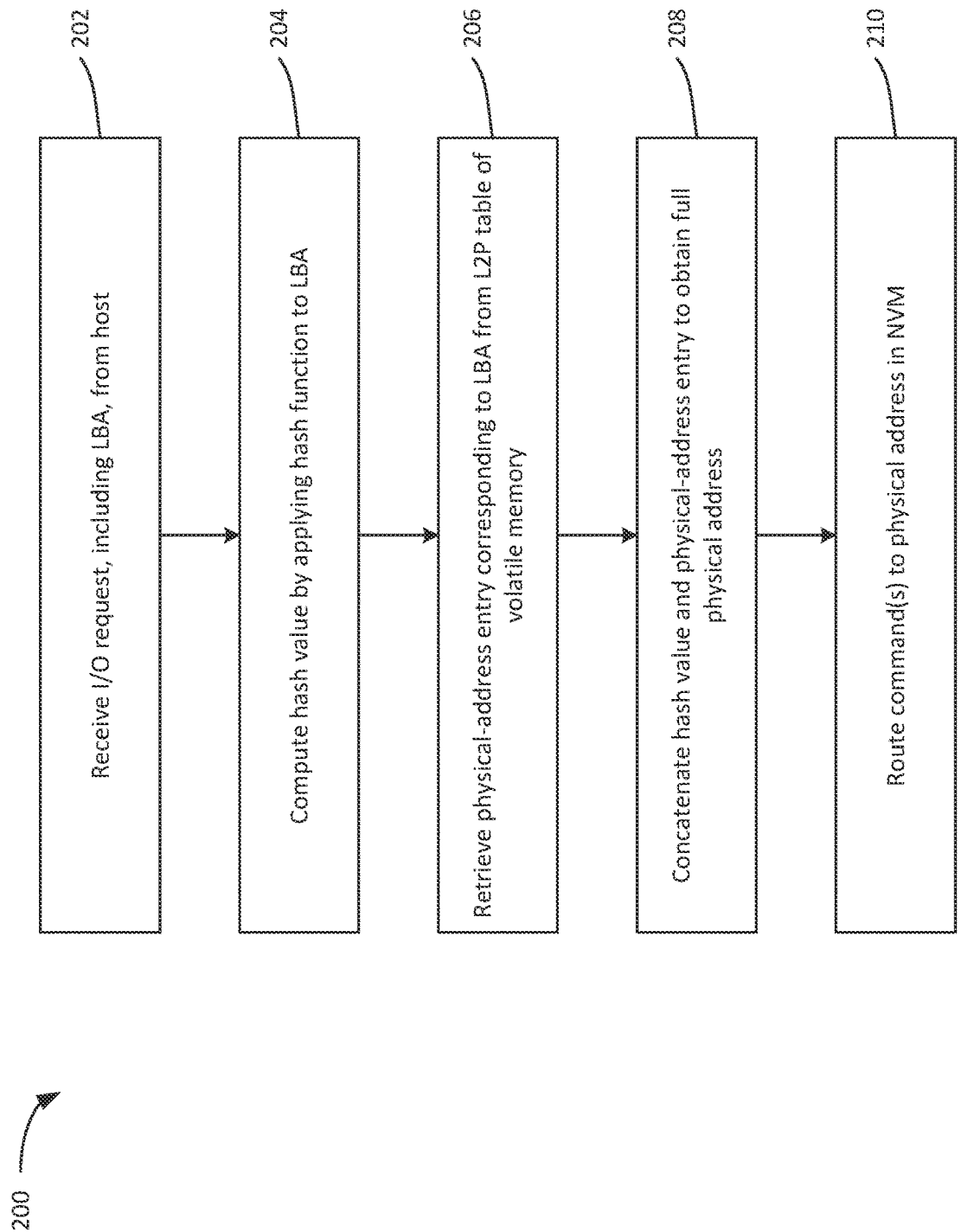
FIG. 2 is a flowchart of a method of processing input/output (I/O) commands in a data storage device of the data-storage system of FIG. 1 according to some embodiments.

FIG. 2 is a flowchart of a method 200 of processing input/output (I/O) commands in data storage device 102 of system 100 according to some embodiments. Different ones of such commands may include a read operation, a program operation, an erase operation, etc. Method 200 is described below in continued reference to FIG. 1.

At step 202 of method 200, controller 110 receives an I/O request from host device 190. The I/O request may typically specify, inter alia, a logical block address (LBA) and a block size.

At step 204, controller 110 operates to apply a hash function to the LBA of step 202 to compute a portion of the corresponding physical address. As already mentioned above, in one example embodiment, such portion can represent the channel number. For example, for an embodiment of NVM 130 having sixteen channels, the computed portion can be 4-bit long. The computation may be performed on the fly by processor 112, without requiring access to any copy of the master L2P table or to DRAM 150.

Herein, the term "hash function" refers to a function configured to map data of arbitrary size to fixed-size values. The input to a hash function is a group of characters that may be referred to as the key, and the values returned by the hash function may be referred to as hash values, hash codes, digests, or simply hashes. The hash value is representative of the original string of characters, but is typically smaller (e.g., shorter) than the original. Hashing may be used as a computationally and storage-space efficient form of data access that avoids the non-linear access time of ordered and unordered lists and structured trees, and the often-exponential storage requirements of direct access of state spaces of large or variable-length keys. Example implementations of hash functions may be based on parity-preserving bit operations (e.g., XOR and ADD), multiply, or divide. Hash functions may be implemented in conjunction with hash tables. In various embodiments, hash functions can be implemented in hardware, firmware, or a suitable combination of hardware and software.

At step 206, controller 110 operates to retrieve from L2P table 160 of DRAM 150 the physical-address entry corresponding to the LBA of step 202. As already indicated above, in an example embodiment, such an entry may contain only the die, block, and page numbers, but not the channel number.

At step 208, controller 110 operates to concatenate the hash value of step 204 with the physical-address entry retrieved at step 206, thereby obtaining the full physical address corresponding to the LBA of step 202, i.e., the address having encoded therein the channel, die, block, and page numbers.

At step 210, controller 110 operates to route the memory command(s) corresponding to the I/O request of step 202 to the memory location in NVM 130 corresponding to the physical address obtained at step 208.

In an alternative embodiment, L2P table 160 of DRAM 150 may be configured to hold physical-address entries containing only the block and page numbers, but not the channel and die numbers. In this case, the hash function used at step 204 may be configured to generate hash values representing the channel and die numbers.

Additional modification to the FTL of data storage device 102 may be considered when method 200 is being implemented therein. More specifically, such considerations may concern I/O requests involving certain write operations and garbage collection.

For example, during a next write operation involving the same LBA, the data are written to a different physical address while the page(s) located at the previous physical address are marked as invalid. According to an example embodiment, the FTL may be configured to select said different physical address to be in the same channel as the previous physical address. Such selection can be accomplished, e.g., by using the hash value of step 204 to restrict the new location choices available to the FTL during such write operations. L2P table 160 may then be updated using the new die, block, and page numbers, without creating inconsistencies and/or any incompatibilities with method 200.

During garbage collection, all valid pages may typically be copied into new locations. Then, all memory locations containing the old data (valid and invalid) are erased, thereby creating space accessible to subsequent data. According to an example embodiment, the FTL may be configured to select such new locations to be in the same channel as the valid pages that are being relocated. In this case, L2P table 160 may also be updated using the new die, block, and page numbers, without creating any incompatibilities with method 200.

In yet another embodiment, method 200 may be adapted for use in an SSD that uses an NVM express (NVMe) Endurance Group mechanism. An endurance group is a collection of NVM sets, which includes namespaces and unallocated storage. Each endurance group may be viewed as a separate pool of storage, e.g., for wear-leveling purposes. Such endurance groups may typically have their own dedicated pool of spare blocks, and the corresponding SSD may typically maintain separate wear statistics for each endurance group.

When the endurance-group capacity is limited to one channel, the physical-address channel bits can be derived directly from the NVM Set Identifier, e.g., by hashing the NVM Set Identifier at step 204 of the corresponding embodiment of method 200. In some alternative embodiments, one endurance group may be mapped to two channels. In such embodiments, the FTL may employ a different (e.g., suitable for this specific configuration) hash function to map the LBA into physical-address bits for translation.

FIG. 3 is a table 300 illustrating example operations of data storage device 102 according to an embodiment. For clarity, various addresses listed in table 300 are presented in decimal form. The physical addresses are shown as strings, each being a sequence of channel, die, block, and page numbers, all in decimal form.

Column 302 of table 300 represents an example sequence of host commands that may be received by data storage device 102. The first data line of column 302 specifies the LBA of the first command in the sequence. The second data line of column 302 specifies the LBA of the second command in the sequence. The third data line of column 302 specifies the LBA of the third command in the sequence, and so on.

Column 304 of table 300 lists the hash values generated at step 204 of method 200 for each of the LBAs listed in column 302. For example, the first data line of column 304 specifies the hash value generated at step 204 of method 200 for the LBA of the first command in the sequence. The second data line of column 304 specifies the hash value generated at step 204 of method 200 for the LBA of the second command in the sequence, and so on.

Sub-table 306 of table 300 illustrates the L2P mapping provided by the FTL of controller 110 in accordance with method 200. The first column of sub-table 306 lists different LBAs in the ascending order. The second column of sub-table 306 lists the physical addresses corresponding to the LBAs listed in the first column thereof. Each physical address is a string of respective channel, die, block, and page numbers. The channel numbers are computed by controller 110 on the fly at the respective instances of step 204 of method 200 using the operative hash function. This can easily be verified, e.g., by comparing some of the LBAs explicitly shown in the first column of sub-table 306 and their physical channel numbers in the second column thereof with the corresponding entries of columns 302 and 304. The substring of respective die, block, and page numbers for each physical address is maintained in and retrieved from L2P table 160 of DRAM 150 by controller 110 at the respective instances of step 206 of method 200.

The arrows in the second column of sub-table 306 indicate updates of L2P table 160 triggered by the next write operation(s) involving the same LBA, which may be requested by host device 190. For example, for LBA=1, the second column of sub-table 306 indicates two updates of the corresponding physical address, the first update being from (1,0,0,0) to (1,1,0,0), and the second update being from (1,1,0,0) to (1,2,0,0). It is evident from this specific example that the channel number remains unchanged during these updates and is the same as the corresponding hash value listed in column 304. The same attribute (i.e., the unchanged channel number) is also evident for other updates of the physical addresses indicated in the second column of sub-table 306.

Sub-table 308 of table 300 illustrates the contents of NVM 130 and their evolution due to the updates indicated in the second column of sub-table 306. The crossed-out numbers in the fifth column of sub-table 308 indicate invalid data at certain physical addresses of NVM 130 due to those updates. Eventual garbage collection may erase those invalid data and relocate the corresponding valid data, e.g., as explained above in the description of method 200, i.e., without changing the respective channel numbers.

To handle memory errors during runtime, data storage device 102 relies on RAS (Reliability, Availability, and Serviceability) features, which helps to prolong the overall system uptime at times of memory errors. The use of such RAS features beneficially enables data storage device 102 to continue operating when there are correctable errors, while logging the uncorrectable error details for future debugging purposes.

One of the most important RAS features implemented in data storage device 102 is the use of one or more ECCs (e.g., see 116, FIG. 1). For example, by generating ECC SECDED (Single-bit Error Correction and Double-bit Error Detection) codes for L2P table 160 and storing them in DRAM 150, DRAM controller 114 can correct single-bit errors and detect double-bit errors on the data retrieved from the DRAM.

In an example embodiment, the following example steps may be used for ECC generation and error check/correction in DRAM controller 114:

(i) Generating the ECC codes based on the write (WR) data;
(ii) Storing in DRAM 150 both the WR data and the corresponding ECC code(s);
(iii) During a read operation, reading both the WR data and the corresponding ECC code(s) from DRAM 150;
(iv) Computing the ECC code(s) based on the WR data received from DRAM 150 and comparing the computed ECC code(s) with the ECC code(s) received from the DRAM;
(v) If the computed and received ECC code(s) match, then routing the WR data received from DRAM 150 in the "as received" form;
(vi) If there are differences between the computed and received ECC code(s), then activating error-correction mechanism, e.g., to correct any single-bit errors and detect double-bit errors, and routing the error-corrected data.

The above-outlined ECC scheme may typically provide end-to-end protection against single-bit errors that occur anywhere between DRAM controller 114 and DRAM 150.

Figure 4:
FIG. 4 is a table illustrating example parameters of a DRAM that may be used in the data-storage system of FIG. 1 according to some embodiments.

FIG. 4 is a table 400 illustrating example parameters of DRAM 150 according to some embodiments. The values shown in table 400 are based on the assumption that most of the DRAM capacity is taken up by L2P table 160. Example parameters of DRAM 150 for three different capacities of NVM 130 are presented. These capacities are listed in the first column (402) of table 400. The corresponding raw NAND capacities (i.e., the corresponding combined capacities of NAND dies 170) are listed in the second column (404) of table 400. The third and fourth columns (406, 408) of table 400 list the corresponding L2P-table entry widths and depths.

The fifth column (410) of table 400 lists estimated capacities of DRAM 150 that may be sufficient for the respective capacities of NVM 130 according to some embodiments. The sixth column (412) of table 400 lists estimated maximum sizes of L2P table 160 that can be stored in DRAM 150 in such embodiments. The difference between the respective values listed in the fifth and sixth columns (410, 412) of table 400 is due to the above-mentioned ECC overhead. More specifically, the following IECC version-2 configurations are being assumed. For the 10-GiB DRAM 150, the ECC uses a 4+1 mode, wherein each codeword is 40-bit long. There may be 5 dies/rank and up to 2 ranks. For the 20-GiB DRAM 150, the ECC uses a 33+7 mode, wherein each codeword is again 40-bit long. There may be 5 dies/rank and up to 4 ranks. For the 40-GiB DRAM 150, the ECC uses a 9+1 mode, wherein each codeword is 80-bit long. There may be 5 dies/rank and up to 4 ranks.

The values listed in the fifth and sixth columns of table 400 indicate a 20% ECC overhead associated the above indicated codes. A relatively recent development, known as IECC version 3, may provide more-efficient codes in terms of the ECC overhead. For example, one of such codes uses a 128+2 mode, wherein each codeword is 130-bit long. This specific code has an ECC overhead of only approximately 1.5%, which is much smaller than that of any of the ECC configurations presented in table 400. However, this specific code is only applicable to L2P entry widths of 32 bits or smaller. As a result, products corresponding to 16- and 32-TiB NAND capacities and not using method 200 may not be able to take advantage of this more-efficient code. Advantageously, the use of method 200 may enable a reduction in the L2P-table entry widths to 32 bits or smaller for some-higher capacity NVMs 130, thereby paving the way for the use of the aforementioned more-efficient code and for a corresponding relative reduction in the size of DRAM 150. For example, an embodiment of data storage device 102 having a 32-TiB NAND capacity and employing method 200 can take advantage of such more-efficient codes and the corresponding DRAM-size and ECC-overhead reductions, which may beneficially lead to reduction in costs in the corresponding tier of data storage devices.

According to an example embodiment disclosed above, e.g., in the summary section and/or in reference to any one or any combination of some or all of FIGS. 1-4, provided is a data storage device (e.g., 102, FIG. 1), comprising: a non-volatile memory (e.g., 130, FIG. 1) to store user data; a volatile memory (e.g., 150, FIG. 1) to store an L2P table (e.g., 160, FIG. 1); and a controller (e.g., 110, FIG. 1) configured to: receive a host request specifying a logical address; compute (e.g., 204, FIG. 2) a hash value by applying a hash function to the logical address, the hash value providing a first portion of a first physical address;

retrieve (e.g., 206, FIG. 2) a second portion of the first physical address from the L2P table based on the logical address; combine the first portion and the second portion to determine the first physical address; and perform a memory operation based on the first physical address.

In some embodiments of the above apparatus, the non-volatile memory comprises a plurality of storage dies organized into two or more memory channels, each of the dies being organized into memory blocks and pages; wherein the first portion comprises a channel number corresponding to the logical address; and wherein the second portion comprises a block number and a page number corresponding to the logical address.

In some embodiments of any of the above apparatus, the first portion further comprises a die number corresponding to the logical address.

In some embodiments of any of the above apparatus, the first portion consists of the channel number and the die number.

In some embodiments of any of the above apparatus, the first portion consists of a channel number.

In some embodiments of any of the above apparatus, the second portion further comprises a die number corresponding to the logical address.

In some embodiments of any of the above apparatus, the second portion consists of the die number, the block number, and the channel number.

In some embodiments of any of the above apparatus, the second portion consists of the block number and the page number.

In some embodiments of any of the above apparatus, the L2P table does not have channel numbers stored therein.

In some embodiments of any of the above apparatus, the controller is configured to combine the first portion and the second portion by concatenating (e.g., 208, FIG. 2) the first portion and the second portion.

In some embodiments of any of the above apparatus, the controller is configured to perform a next write operation involving the logical address by writing to a different second physical address in the non-volatile memory, each of the first physical address and the second physical address including the hash value as a portion thereof (e.g., as indicated in 306, 308, FIG. 3).

In some embodiments of any of the above apparatus, the controller is configured to perform garbage collection, the garbage collection including moving valid user data from the first physical address to a different second physical address in the non-volatile memory, each of the first physical address and the second physical address including the hash value as a portion thereof.

In some embodiments of any of the above apparatus, the controller is configured to: retrieve the second portion from the volatile memory together with a corresponding ECC portion stored therein; and check for errors in the second portion using the ECC portion.

In some embodiments of any of the above apparatus, an ECC overhead associated with storage of the ECC portion in the volatile memory is less than 5%; and wherein the first physical address has a length of more than 32 bits.

According to another example embodiment disclosed above, e.g., in the summary section and/or in reference to any one or any combination of some or all of FIGS. 1-4, provided is a method (e.g., 200, FIG. 2) of processing host requests in a data storage device (e.g., 102, FIG. 1) comprising a non-volatile memory (e.g., 130, FIG. 1) to store user data and a volatile memory (e.g., 150, FIG. 1) to store an L2P table (e.g., 160, FIG. 1), the method comprising the steps of: receiving (e.g., 202, FIG. 2) a host request including a logical address; computing (e.g., 204, FIG. 2) a hash value by applying a hash function to the logical address, the hash value providing a first portion of a first physical address in the non-volatile memory; retrieving (e.g., 206, FIG. 2) a second portion of the first physical address from the L2P table based on the logical address; combining the first portion and the second portion to determine the first physical address; and performing a memory operation based on the first physical address.

In some embodiments of the above method, the combining comprises concatenating (e.g., 208, FIG. 2) the first portion and the second portion.

In some embodiments of any of the above methods, the method further comprises performing a next write operation involving the logical address by writing to a different second physical address in the non-volatile memory, each of the first physical address and the second physical address including the hash value as a portion thereof (e.g., as indicated in 306, 308, FIG. 3).

In some embodiments of any of the above methods, the method further comprises performing garbage collection, the garbage collection including moving valid user data from the first physical address to a different second physical address in the non-volatile memory, each of the first physical address and the second physical address including the hash value as a portion thereof.

In some embodiments of any of the above methods, the method further comprises: retrieving the second portion from the volatile memory together with a corresponding ECC portion stored therein; and checking for errors in the second portion using the ECC portion.

According to yet another example embodiment disclosed above, e.g., in the summary section and/or in reference to any one or any combination of some or all of FIGS. 1-4, provided is an apparatus comprising: non-volatile memory means (e.g., 130, FIG. 1) for storing user data; volatile memory means (e.g., 150, FIG. 1) for storing an L2P table (e.g., 160, FIG. 1); means for receiving (e.g., 202, FIG. 2) a host request including a logical address; means for computing (e.g., 204, FIG. 2) a hash value by applying a hash function to the logical address, the hash value providing a first portion of a first physical address in the non-volatile memory; means for retrieving (e.g., 206, FIG. 2) a second portion of the first physical address from the L2P table based on the logical address; means for combining the first portion and the second portion to determine the first physical address; and means for performing a memory operation based on the first physical address.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain implementations and should in no way be construed to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

Unless explicitly stated otherwise, each numerical value and range should be interpreted as being approximate as if the word "about" or "approximately" preceded the value or range.

The use of figure numbers and/or figure reference labels (if any) in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Unless otherwise specified herein, in addition to its plain meaning, the conjunction "if" may also or alternatively be construed to mean "when" or "upon" or "in response to determining" or "in response to detecting," which construal may depend on the corresponding specific context. For example, the phrase "if it is determined" or "if [a stated condition] is detected" may be construed to mean "upon determining" or "in response to determining" or "upon detecting [the stated condition or event]" or "in response to detecting [the stated condition or event]."

Throughout the detailed description, the drawings, which are not to scale, are illustrative only and are used in order to explain, rather than limit the disclosure. The use of terms such as height, length, width, top, bottom, is strictly to facilitate the description of the embodiments and is not intended to limit the embodiments to a specific orientation. For example, height does not imply only a vertical rise limitation, but is used to identify one of the three dimensions of a three-dimensional structure as shown in the figures. Such "height" would be vertical where the electrodes are horizontal but would be horizontal where the electrodes are vertical, and so on. Similarly, while all figures show the different layers as horizontal layers such orientation is for descriptive purpose only and not to be construed as a limitation.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. The same type of distinction applies to the use of terms "attached" and "directly attached," as applied to a description of a physical structure. For example, a relatively thin layer of adhesive or other suitable binder can be used to implement such "direct attachment" of the two corresponding components in such physical structure.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and nonvolatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

As used in this application, the term "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

"SUMMARY" in this specification is intended to introduce some example embodiments, with additional embodiments being described in "DETAILED DESCRIPTION" and/or in reference to one or more drawings. "SUMMARY" is not intended to identify essential elements or features of the claimed subject matter, nor is it intended to limit the scope of the claimed subject matter.

"ABSTRACT" is provided to allow the reader to quickly ascertain the nature of the technical disclosure. It is submitted with the understanding that it will not be used to interpret or limit the scope or meaning of the claims. In addition, in the foregoing "DETAILED DESCRIPTION," it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into "DETAILED DESCRIPTION," with each claim standing on its own as a separately claimed subject matter.

What is claimed is:

1. A data storage device, comprising:
    a non-volatile memory comprising a plurality of storage dies organized into two or more memory channels, each of the dies being organized into memory blocks and pages to store user data;
    a volatile memory to store a logical-to-physical (L2P) table; and
    a controller configured to:
        receive a host request specifying a logical address;
        compute a hash value by applying a hash function to the logical address, the hash value providing a first portion of a first physical address comprising a channel number corresponding to the logical address;
        retrieve a second portion of the first physical address from the L2P table based on the logical address;
        combine the first portion and the second portion to determine the first physical address; and
        perform a memory operation based on the first physical address.

2. The data storage device of claim 1,
    wherein the second portion comprises a block number and a page number corresponding to the logical address.

3. The data storage device of claim 1, wherein the first portion further comprises a die number corresponding to the logical address.

4. The data storage device of claim 3, wherein the first portion consists of the channel number and the die number.

5. The data storage device of claim 1, wherein the first portion consists of the channel number.

6. The data storage device of claim 2, wherein the second portion further comprises a die number corresponding to the logical address.

7. The data storage device of claim 6, wherein the second portion consists of the die number, the block number, and the channel number.

8. The data storage device of claim 2, wherein the second portion consists of the block number and the page number.

9. The data storage device of claim 1, wherein the L2P table does not have channel numbers stored therein.

10. The data storage device of claim 1, wherein the controller is configured to combine the first portion and the second portion by concatenating the first portion and the second portion.

11. The data storage device of claim 1, wherein the controller is configured to perform a next write operation involving the logical address by writing to a different second physical address in the non-volatile memory, each of the first physical address and the second physical address including the hash value in the first portion thereof.

12. The data storage device of claim 1, wherein the controller is configured to perform garbage collection, the garbage collection including moving valid user data from the first physical address to a different second physical address in the non-volatile memory, each of the first physical address and the second physical address including the hash value in the first portion thereof.

13. The data storage device of claim 1, wherein the controller is configured to:
    retrieve the second portion from the volatile memory together with a corresponding error-correction-code (ECC) portion stored therein; and
    check for errors in the second portion using the ECC portion.

14. The data storage device of claim 13,
    wherein an ECC overhead associated with storage of the ECC portion in the volatile memory is less than 5%; and
    wherein the first physical address has a length of more than 32 bits.

15. A method of processing host requests in a data storage device comprising a non-volatile memory to store user data and a volatile memory to store a logical- to-physical (L2P) table, the method comprising:
    receiving a host request including a logical address;
    computing a hash value by applying a hash function to the logical address, the hash value providing a first portion of a first physical address in the non-volatile memory, the non-volatile memory including a plurality of storage dies organized into two or more memory channels, each of the dies being organized into memory blocks and pages to store user data the first portion including a channel number corresponding to the logical address;
    retrieving a second portion of the first physical address from the L2P table based on the logical address;
    combining the first portion and the second portion to determine the first physical address; and
    performing a memory operation based on the first physical address.

16. The method of claim 15, wherein the combining comprises concatenating the first portion and the second portion.

17. The method of claim 15, further comprising performing a next write operation involving the logical address by writing to a different second physical address in the non-volatile memory, each of the first physical address and the second physical address including the hash value in the first portion thereof.

18. The method of claim 15, further comprising performing garbage collection, the garbage collection including moving valid user data from the first physical address to a different second physical address in the non-volatile memory, each of the first physical address and the second physical address including the hash value in the first portion thereof.

19. The method of claim 15, further comprising:
retrieving the second portion from the volatile memory together with a corresponding error-correction-code (ECC) portion stored therein; and
checking for errors in the second portion using the ECC portion.

20. An apparatus, comprising:
non-volatile memory means for storing user data including a plurality of storage dies organized into two or more memory channels, each of the dies being organized into memory blocks and pages;
volatile memory means for storing a logical-to-physical (L2P) table;
means for receiving a host request including a logical address;
means for computing a hash value by applying a hash function to the logical address, the hash value providing a first portion of a first physical address including a channel number corresponding to the logical address;
means for retrieving a second portion of the first physical address from the L2P table based on the logical address;
means for combining the first portion and the second portion to determine the first physical address; and
means for performing a memory operation in the non-volatile memory means based on the first physical address.

* * * * *